(12) United States Patent
Yang et al.

(10) Patent No.: US 11,767,238 B1
(45) Date of Patent: Sep. 26, 2023

(54) NONHOMOGENEOUS SOIL POLLUTANT MULTIPHASE EXTRACTION AND TAIL GAS PURIFYING DEVICE, AND APPLICATION METHOD THEREOF

(71) Applicant: Technical Centre for Soil, Agriculture and Rural Ecology and Environment, Ministry of Ecology and Environment, Beijing (CN)

(72) Inventors: Yang Yang, Beijing (CN); Hao Zhang, Beijing (CN); Juan Li, Beijing (CN); Huan Huan, Beijing (CN); Haizhou Wang, Beijing (CN); Weijiang Liu, Beijing (CN); Xiaobing Zhao, Beijing (CN)

(73) Assignee: Technical Centre for Soil, Agriculture and Rural Ecology and Environment, Ministry of Ecology and Environment, Beijing (CN)

( * ) Notice: Subject to any disclaimer, the term of this patent is extended or adjusted under 35 U.S.C. 154(b) by 0 days.

(21) Appl. No.: 18/185,319

(22) Filed: Mar. 16, 2023

(30) Foreign Application Priority Data

Apr. 18, 2022 (CN) .......................... 202210403329.7

(51) Int. Cl.
*B09C 1/00* (2006.01)
*C02F 1/40* (2023.01)
(Continued)

(52) U.S. Cl.
CPC ................ *C02F 1/40* (2013.01); *B01D 53/02* (2013.01); *B09C 1/005* (2013.01); *C02F 1/004* (2013.01);
(Continued)

(58) Field of Classification Search
CPC .......... B09C 1/005; B09C 1/002; B09C 1/02; B09C 2101/00; C02F 1/40; C02F 2101/322; C02F 1/004; C02F 2103/06
See application file for complete search history.

(56) References Cited

U.S. PATENT DOCUMENTS 5,449,251 A     9/1995  Daily et al.
5,476,992 A  *  12/1995 Ho .................... E21B 43/2401
                                                         588/302
(Continued)

FOREIGN PATENT DOCUMENTS

CN      107350278 A    11/2017
CN      110153159 A     8/2019
(Continued)

OTHER PUBLICATIONS

Yuxuan Peng et al., "Three-Dimensional Spatial Interpolation of Soil Pollutant at Contaminated Sites: Progress and Prospects", Chinese Journal of Soil Science, Oct. 6, 2021, pp. 1244-1249.
(Continued)

*Primary Examiner* — Carib A Oquendo

(57) ABSTRACT

The present invention discloses a nonhomogeneous soil pollutant multiphase extraction and tail gas purifying device and an application method thereof. The device comprises two water retaining walls, a water layer extraction system and a near-water soil layer extraction system, a nonhomogeneous soil layer extraction system and a geophysical prospecting system, etc. The distribution of pollutants and the range of the pollution plume can be determined through geophysical prospecting, borehole exploration, three-dimensional simulation, etc.; through the combined application of the water retaining wall and the water pumping and supplementing self-circulation system, it is beneficial to form a stable treatment area for the occurrence area of the groundwater layer; the arrangement of the water layer extraction
(Continued)

system facilitates the liquid extraction of the organic pollutants in a free phase and a dissolved phase at the groundwater.

10 Claims, 17 Drawing Sheets

(51) Int. Cl.
  *C02F 1/00* (2023.01)
  *B01D 53/02* (2006.01)
  *C02F 101/32* (2006.01)
  *C02F 103/06* (2006.01)

(52) U.S. Cl.
  CPC .... *C02F 2101/322* (2013.01); *C02F 2103/06* (2013.01); *C02F 2201/005* (2013.01)

(56) References Cited

U.S. PATENT DOCUMENTS

| | | | | |
|---|---|---|---|---|
| 5,840,191 | A * | 11/1998 | Eccles | B09C 1/10 |
| | | | | 210/500.36 |
| 6,099,206 | A * | 8/2000 | Pennell | B09C 1/002 |
| | | | | 588/249 |
| 6,379,083 | B1 * | 4/2002 | Maeda | B09C 1/02 |
| | | | | 588/318 |
| 2004/0126190 | A1 | 7/2004 | Stegemeier et al. | |
| 2005/0207847 | A1 * | 9/2005 | Hayes | B09C 1/06 |
| | | | | 405/128.35 |
| 2012/0305479 | A1 * | 12/2012 | Falatko | C02F 3/28 |
| | | | | 210/610 |
| 2019/0324008 | A1 * | 10/2019 | Kiyotomo | G01N 33/24 |
| 2020/0061683 | A1 * | 2/2020 | Inaba | B09C 1/00 |

FOREIGN PATENT DOCUMENTS

| | | |
|---|---|---|
| CN | 111282979 A | 6/2020 |
| CN | 111589850 A | 8/2020 |
| CN | 111659723 A | 9/2020 |
| CN | 112620325 A | 4/2021 |
| EP | 1550519 A1 | 7/2005 |
| JP | H07280712 A | 10/1995 |
| JP | 2019089049 A | 6/2019 |

OTHER PUBLICATIONS

Ke Rui, "Application Research of Ground Penetrating Radar and Borehole Sampling Analysis in Investigation of a Chromium Contaminated Site", China Master's Theses Full-text Database Engineering Technology I, No. 10, Oct. 15, 2020, pp. 1-73.

* cited by examiner

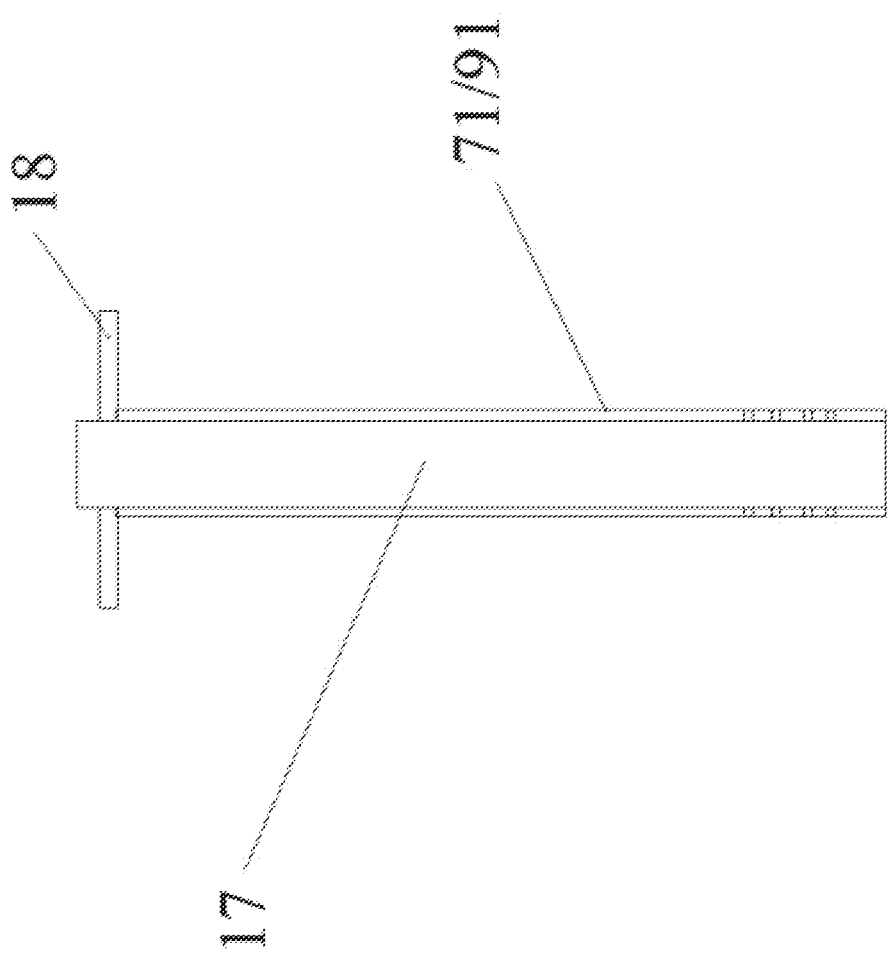

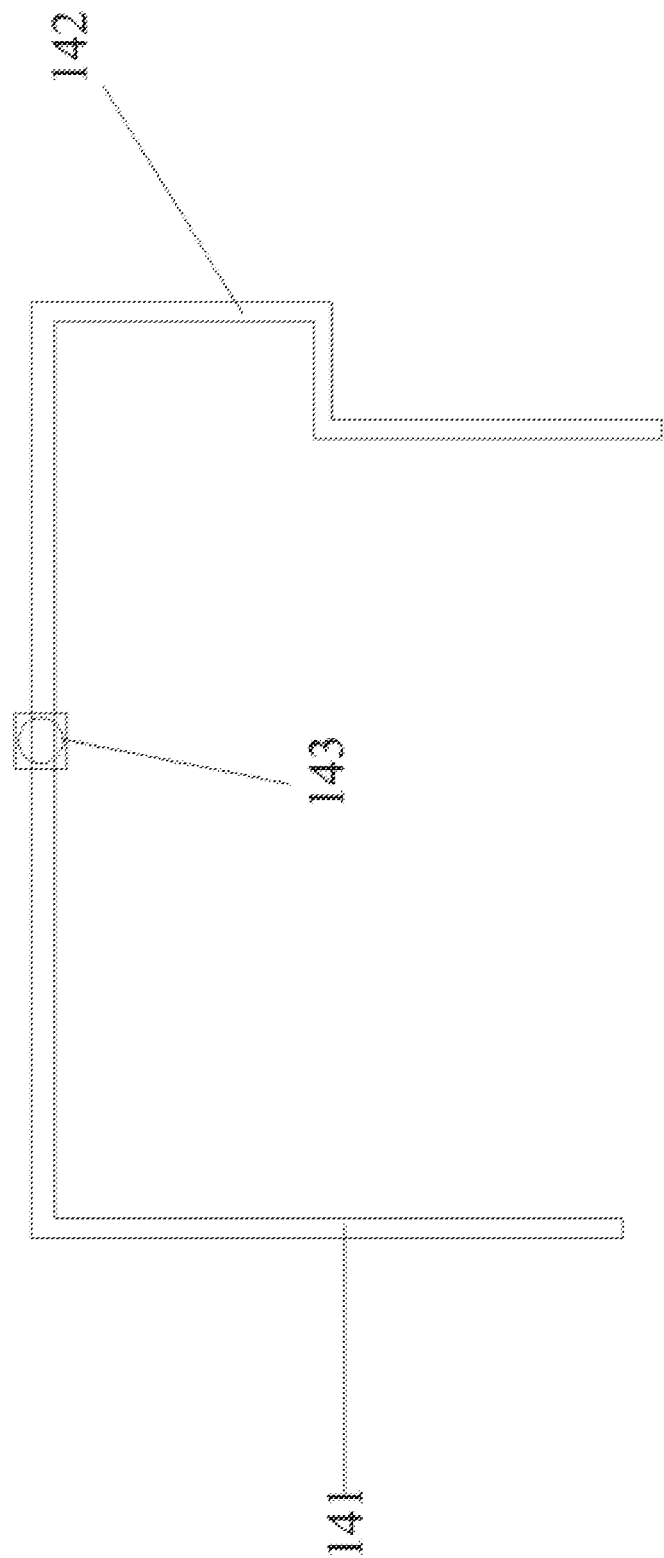

NONHOMOGENEOUS SOIL POLLUTANT MULTIPHASE EXTRACTION AND TAIL GAS PURIFYING DEVICE, AND APPLICATION METHOD THEREOF

CROSS REFERENCE TO RELATED APPLICATIONS

This application claims foreign priority of Chinese Patent Application No. 202210403329.7, filed on Apr. 18, 2022 in the China National Intellectual Property Administration, the disclosures of all of which are hereby incorporated by reference.

TECHNICAL FIELD

The present invention is in the technical field of organic volatile pollution site treatment, and particularly relates to a nonhomogeneous soil pollutant multiphase extraction and tail gas purifying device and an application method thereof.

BACKGROUND ART

The treatment of the volatile organic pollutants has always been a difficulty in pollutant treatment because of its existence in the form of multiphase in the soil body and water body. Especially when pollutants leak out, as a groundwater layer is included, the treatment will be more difficult under the effect of water-soil coupling. Moreover, the existence of a nonhomogeneous soil layer in the soil layer will affect the migration of organic pollutants and form local enrichment. Therefore, it is necessary to treat organic matter volatile pollutants specifically in the complex environment containing the nonhomogeneous soil layer and the groundwater layer. Furthermore, the pollutants corresponding to different phases need to be targeted for previous preparation and later-period tail gas treatment.

SUMMARY OF THE INVENTION

The present invention provides a nonhomogeneous soil pollutant multiphase extraction and tail gas purifying device and an application method thereof, so as to solve the technical problems of the regional treatment of organic pollutants, multiphase treatment, and the comprehensive treatment of tail gas and tail liquid in a nonhomogeneous soil layer containing groundwater layer.

In order to achieve the above object, the invention adopts the following technical solution:

a nonhomogeneous soil pollutant multiphase extraction and tail gas purifying device, comprising two water retaining walls, a water layer extraction system and a near-water soil layer extraction system arranged in a groundwater layer in the two water retaining walls, a nonhomogeneous soil layer extraction system arranged at a nonhomogeneous soil layer in a homogeneous soil layer, a geophysical prospecting system arranged at a top of the homogeneous soil layer, and the main connection pipeline connected in parallel to the water layer extraction system, the near-water soil layer extraction system, the nonhomogeneous soil layer extraction system and the water layer extraction system; a dosing and steam integrated device connected to one end of the main connection pipeline, and a tail gas purifying apparatus connected to the other end of the main connection pipeline;

wherein the groundwater layer is located below the groundwater layer, the homogeneous soil layer is located above the groundwater layer, the nonhomogeneous soil layer is located inside the homogeneous soil layer, and a pollution point is located above the nonhomogeneous soil layer; pollutants of the pollution point are organic matter volatile pollutants;

the water layer extraction system comprises an extraction outer cylinder, a extraction inner cylinder detachably connected to the inside of the extraction outer cylinder, a horn connector connected to the top of the extraction outer cylinder or a straight connector connected to the top of the extraction outer cylinder, a water layer gas delivery pipeline and a water-layer fluid-conveying pipeline connected to the top of the horn connector or the straight connector, a water layer extraction pump connected to the water layer gas delivery pipeline, and a water layer circulation pump connected to the water-layer fluid-conveying pipeline; a gas delivery pipeline and the water-layer fluid-conveying pipeline are both connected to the tail gas purifying apparatus and are correspondingly provided with a valve; the water-layer fluid-conveying pipeline is also connected to the water supply tank; the liquid extraction inner cylinder bottom part extends out of the outer extraction cylinder, and the liquid extraction inner cylinder extends into a water body;

the dosing and steam integrated device comprises separate dosing chamber and pressurized hot steam chamber, and both the dosing chamber and the pressurized hot steam chamber are respectively detachably connected to the main connection pipeline; the main connection pipeline is provided with a valve corresponding to the water layer extraction system, the near-water soil layer extraction system, the nonhomogeneous soil layer extraction system, and the water layer extraction system; the main connection pipeline comprises a main connection pipe body connected to the tail gas purifying apparatus, a main connection pump connected to the main connection pipe body, and a main connection liquid pipe connected between the main connection pipe body and the tail gas purifying apparatus.

Further, one water retaining wall is located at one side of the nonhomogeneous soil body adjacent to the downstream of the groundwater body, and the other water retaining wall is located at the downstream side of the groundwater body pollution halo; a water pumping and supplementing self-circulation system is further provided on the outer side of the water retaining wall.

the water pumping and supplementing self-circulation system comprises a water pumping pipe, a water supplementing pipe, and a pumping and supplementing self-circulation pump connected between the water pumping pipe and the water supplementing pipe; the water pumping pipe is located at the water body reaching a standard upstream of the groundwater layer, and the water supplementing pipe is located outside the water retaining wall of the groundwater body on the downstream side of pollution halo; a flow velocity of the water body in the pumping self-circulation pump is adapted to a natural flow velocity of the groundwater layer.

Further, the extraction outer cylinder comprises an extraction outer cylinder wall and extraction outer cylinder holes arranged at intervals on the extraction outer cylinder wall; the extraction outer cylindrical hole is provided according to a height of a soil body position by adapting to pollutants at a near-water layer;

the liquid extraction inner cylinder comprises a liquid extraction inner cylinder wall and a liquid extraction inner cylinder bottom detachably connected to the bottom of the liquid extraction inner cylinder wall;

the liquid extraction inner cylinder bottom is a mesh plate body, the liquid extraction inner cylinder bottom is detachably connected to a filter plate or a plugging plat, and the top of the plugging plate is correspondingly connected to an attaching pad; the attaching pad is an inverted T-shaped piece, a transverse part of the inverted T-shaped piece is an apical grafting insertion rod corresponding to a vertical part of a sealing pad, and an insertion rod is a rigid feeding rod.

Further, the near-water soil layer extraction system comprises a near-water extraction cylinder, a near-water composite pipeline connected between the near-water extraction cylinder and the main connection pipeline, a near-water gas delivery pipe connected between the near-water extraction cylinder and the main connection pipeline, and a near-water extraction pump connected to the near-water gas delivery pipe;

the nonhomogeneous soil layer extraction system comprises a nonhomogeneous soil layer extraction cylinder, a nonhomogeneous soil layer composite pipeline connected between the nonhomogeneous soil layer extraction cylinder and the main connection pipeline, a nonhomogeneous soil layer gas delivery pipeline connected between the nonhomogeneous soil layer extraction cylinder and the main connection pipeline, and a nonhomogeneous soil layer extraction pump connected to the nonhomogeneous soil layer gas delivery pipeline;

the water composite pipeline, the near-water gas delivery pipeline, the nonhomogeneous soil layer composite pipeline, and the nonhomogeneous soil layer gas delivery pipe are all correspondingly provided with a valve.

Further, an inner blocking cylinder is also detachably connected in the near-water extraction cylinder and the nonhomogeneous soil layer extraction cylinder, a cross bar member is detachably connected at the top of the inner blocking cylinder, the inner blocking cylinder comprises an upper non-porous plate and a lower porous plate, and the lower porous plate is arranged corresponding to hole walls of extraction cylinders in the near-water extraction cylinder and the nonhomogeneous soil layer extraction cylinder, and its height is arranged corresponding to a dosing height.

Further, the geophysical prospecting system comprises a geophysical prospecting point, a geophysical prospecting connecting line connected in series thereon, and a geophysical prospecting integrated data processor provided on one side; the geophysical prospecting point is correspondingly provided with a geophysical prospecting instrument, and the geophysical prospecting point is provided at least at the pollution point and upstream and downstream of soil body pollution plume.

Further, the tail gas purifying apparatus comprises a spraying layer at the top, an adsorption layer below the spraying layer, a liquid-collecting stuffing chamber and a filter chamber below the adsorption layer, wherein the adsorption layer is correspondingly connected to the main connection pipe body, and the liquid-collecting stuffing chamber is correspondingly connected to the main connection liquid pipe and the water-layer fluid-conveying pipeline.

Further, the construction method for a nonhomogeneous soil pollutant multiphase extraction and tail gas purifying device is further described, and the specific steps are as below:

step 1, based on the position of the pollution point, performing a layout of the geophysical prospecting point; then connecting the geophysical prospecting point to be finally connected to the geophysical prospecting integrated data processor; combining geophysical prospecting data and borehole exploration data, determining soil layer distribution, groundwater distribution, flow direction, and flow velocity of a polluted land parcel, and defining the position and a range of the nonhomogeneous soil layer;

step 2, based on the geophysical prospecting data and geological survey data at the position containing the pollutants, performing a simulation in a laboratory by means of a test simulation tank, and laying off the geophysical prospecting data and saving the same before setting the pollution point in the test simulation tank, and then setting the pollution point correspondingly for the test simulation tank and collecting the geophysical prospecting data and pollutant data at each stage of pollutant migration, and fitting a pollutant migration law according to the geophysical prospecting data at each stage to obtain a change response law of the geophysical prospecting data;

step 3, fitting a test result with a three-dimensional software to simulate solute migration, obtaining an accurate three-dimensional model after the fitting meets the standard, then determining the range of pollution plume, and calibrating a site actual control range through a three-dimensional model; at this time, collecting site geophysical prospecting data at regular intervals, and performing a comparative analysis on the same with the geophysical prospecting data obtained from the test so as to correct the model in time;

step 4, then performing site drilling and sampling to further refine and measure the range of the pollution plume, and performing encrypted laying-off on the nonhomogeneous soil layer; then dividing a pollution site into two areas; one being a pollution area of the nonhomogeneous soil layer and the other being the pollution area of the groundwater layer;

step 5, providing one water retaining wall between the pollution area of the homogeneous soil layer and the pollution area of the groundwater layer and providing another water retaining wall downstream the groundwater, and at the same time, providing a water pumping and supplementing self-circulation system on one side of the water-retaining wall upstream and downstream of the groundwater meeting the standard so that the water bodies on both sides of the water retaining wall maintain a natural flow velocity;

step 6, installing the water layer extraction system at a position where pollutants are enriched in the groundwater in the two water retaining walls, and installing the near-water soil layer extraction system at the water retaining wall adjacent to the upstream; installing the nonhomogeneous soil layer extraction system around the nonhomogeneous soil layer; then connecting the main connection pipeline correspondingly to the top of the water layer extraction system, the near-water soil layer extraction system, the nonhomogeneous soil layer extraction system, and the water layer extraction system; then, connecting two ends of the main connection pipeline correspondingly to the dosing and steam integrated device and the tail gas purifying apparatus;

step 7, when the pollutants are treated, in the water layer extraction system at the groundwater layer, firstly connecting the straight connector to start the liquid extraction inner cylinder, and after the filter plate is installed, performing extraction of the pollutants flowing in a dissolved state and a free state so that they enter the tail gas purifying apparatus through the water-layer fluid-conveying pipeline; after extracted liquid to be tested contains pollutants less than an extraction standard, sealing the liquid extraction inner cylinder by inserting and installing the plugging plate and the attaching pad, and then filling hot water through the water supply tank, wherein a temperature of hot water is adapted to a volatilization temperature of the pollutants;

step 8, during the extraction construction in the near-water soil layer extraction system and nonhomogeneous soil layer extraction system, firstly injecting hot steam and a medicament via the dosing and steam integrated device and the main connection pipeline, and when injecting, gradually and appropriately adding medicament and hot steam in layers and heights via the inner blocking cylinder and the cross bar member; then, after sufficient reaction, performing volatile gas phase extraction of pollutants through the near-water extraction cylinder and the nonhomogeneous soil layer extraction cylinder;

and step 9, correspondingly, when gas is extracted from inside the near-water soil layer extraction system, replacing the straight connector of the water layer extraction system with the horn connector and injecting hot water into the extraction inner cylinder, wherein the temperature of the hot water is adapted to the pollutant volatilization temperature; then starting the extraction outer cylinder to perform the extraction of pollutant gas phase, and making it enter the tail gas purifying apparatus through the water layer gas delivery pipeline so that multiphase extraction, and tail gas and tail liquid treatment of organic volatilizable pollutants are thereby achieved.

Further, the test simulation tank is a cuboid sand box, wherein the cuboid sand box is provided in a rectangular-ambulatory-plane, the corresponding soil layer and groundwater layer are provided in an inner rectangle shape, and a circulating water body is provided between an outer rectangle shape and the inner rectangle shape, the water body between the inner rectangle shape and outer rectangle shape being in communication with a simulated groundwater layer.

Further, in the tail gas purifying apparatus, the spraying layer at the top and the adsorption layer below are arranged in an inverted triangular shape, the spraying layer is not arranged right above the adsorption layer, the spraying layers on the two sides are low-pressure air-entraining, and the sprayed liquid is collected into the liquid-collecting stuffing chamber below; the filler in the liquid-collecting stuffing chamber is an iron-manganese oxide composite carbon-based functional material, and a permeable membrane is provided in the filter chamber.

The invention has the following beneficial effects.

1) By means of geophysical prospecting, borehole exploration, and three-dimensional simulation, etc., the present invention can define the distribution status of pollutants and the range of the pollution plume for further processing via a control interface; through the response and monitoring of nonhomogeneous formation distribution and characteristic pollutant occurrence area, the free phase organic pollutant occurrence area can be effectively defined, and the accurate detection of free phase pollutant burial location in nonhomogeneous formation and the adjustment of simulation model can be formed;

2) the combined application of the water retaining wall and the water pumping and supplementing self-circulation system in the present invention is beneficial to form a stable treatment area for the occurrence area at the groundwater layer, and the application of the water pumping and supplementing self-circulation system can ensure the water pressure on two sides of the water retaining wall and ensure the stability of the upper soil body;

3) the present invention facilitates liquid extraction of organic pollutants in a free phase and a dissolved phase at the groundwater through the provision of a water layer extraction system, wherein the extraction inner cylinder can also take into account the temperature increase when the extraction outer cylinder pumps air; in addition, the liquid and gaseous pollutants are sent to the tail gas purifying apparatus for post-treatment by the water layer extraction system correspondingly, which is beneficial for targeted treatment and cost-saving;

4) in the present invention, by means of the provision of the main connection pipeline, one end is connected to a dosing and steam integrated device, and the other end is connected to the tail gas purifying apparatus so that the main connection pipeline can be used for both dosing and heating the steam and can be used as a pipeline for collecting volatiles in a gas phase;

5) in the present invention, by dividing the pollution area of the nonhomogeneous soil layer and the pollution area of the groundwater layer, and by providing a nonhomogeneous soil layer extraction system and a near-water soil layer extraction system, regional treatment is facilitated; the near-water soil layer extraction system is also used in combination with the water layer extraction system, so as to facilitate the intensive treatment of pollutants in the soil body near the groundwater;

6) in the present invention, through the provision of the test simulation tank, on the one hand, it is beneficial to characterize the migration process of pollutants so as to preliminarily determine the scope of the pollution plume, and on the other hand, it can be combined with the geophysical prospecting arrangement to carry out the rule summary of geophysical prospecting data so as to guide the actual construction and the modification of the three-dimensional model;

7) according to the present invention, by means of the tail gas purifying apparatus, pollutants in a gas phase, a free phase, and a dissolved phase can be respectively collected and subjected to a differential purification treatment and, in particular, the treatment of the tail gas is divided into two steps: firstly, performing the treatment by adsorption, and performing further treatment by spraying the escape.

Other features and advantages of the invention will be set forth in the description which follows, and in part will become apparent from the description, or may be learned by practice of the invention; the principal objects and other advantages of the invention may be realized and attained by means of the solutions particularly pointed out in the description.

BRIEF DESCRIPTION OF THE DRAWINGS

FIG. 16 is a schematic view of an adapting structure of an inner blocking cylinder and a cross bar member;

FIG. 17 is a schematic view of the connection of a water pumping and supplementing self-circulation system.

Figure 1:
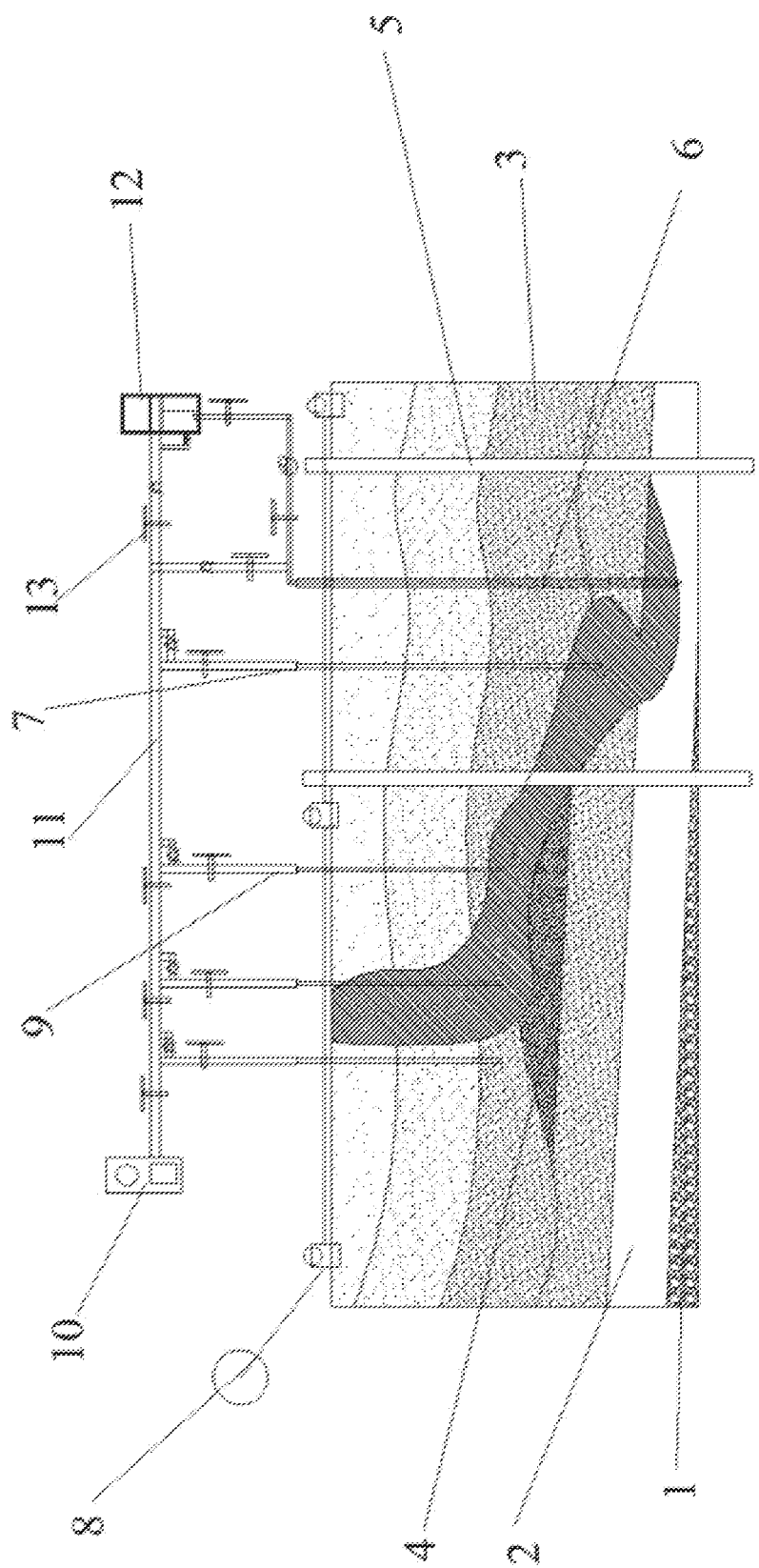
FIG. 1 shows a nonhomogeneous soil pollutant multiphase extraction and tail gas purifying device 1.

Reference numerals: 1-underwater soil layer, 2-groundwater layer, 3-homogeneous soil layer, 4-nonhomogeneous soil layer, 5-water retaining wall, 6-water layer extraction system, 61-extraction outer cylinder, 611-extraction outer cylinder wall, 612-extraction outer cylinder hole, 62-liquid extraction inner cylinder, 621-liquid extraction inner cylinder wall, 622-liquid extraction inner cylinder bottom, 623-filter plate, 624-plugging plate, 625-attaching pad, 626-hot water, 63-horn connector, 64-straight connector, 65-water layer gas delivery pipeline, 66-water layer extraction pump, 67-water-layer fluid-conveying pipeline, 68-water layer circulation pump, 69-water supply tank, 7-near-water soil layer extraction system, 71-near-water extraction cylinder, 72-near-water composite pipeline, 73-near-water extraction pump, 74-near-water gas delivery pipe, 8-geophysical prospecting system, 81-geophysical prospecting point, 82-geophysical prospecting connecting line, 83-geophysical prospecting integrated data processor, 9-nonhomogeneous soil layer extraction system, 91-nonhomogeneous soil layer extraction cylinder, 92-nonhomogeneous soil layer composite pipeline, 93-nonhomogeneous soil layer extraction pump, 94-nonhomogeneous soil layer gas delivery pipe, 10-dosing and steam integrated device, 11-main connection pipeline, 111-main connection pipe body, 112-main connection pump, 113-main connection liquid pipe, 12-tail gas purifying apparatus, 121-spraying layer, 122-adsorption layer, 123-liquid-collecting stuffing chamber, 124-filter chamber, 13-valve, 14-water pumping and supplementing self-circulation system, 141-water pumping pipe, 142-pumping and supplementing self-circulation pump, 143-water supplementing pipe, 15-test simulation tank, 16-pollution point, 17-inner blocking cylinder, and 18-cross bar member.

DETAILED DESCRIPTION OF THE INVENTION

Taking petroleum pollutants as an example, petroleum contains a large amount of benzene series, which are organic matter volatile pollutants. Benzene series pollution will be caused after the petroleum delivering pipeline leaks or the petroleum storage tank is damaged and leaks. Benzene series exist in the state of gas, liquid, and NAPL (Non-aqueous Phase Liquid) in the soil body. When groundwater layer 2 exists, the benzene series will float and enrich and partially dissolve on the surface of the groundwater. In addition, the benzene series also have free states existing in the soil body and on the surface of the groundwater and will change between different phase states according to the change in the environment.

When a nonhomogeneous soil layer 4 is contained in a homogeneous soil layer 3, the nonhomogeneous soil layer 4 has a blocking and intercepting effect on the migration of petroleum pollutants. When an aquifer exists under the nonhomogeneous soil layer 4, a large number of pollutants will be concentrated into the groundwater layer 2, so the extraction construction for a general homogeneous soil layer 3 is different so as to meet the treatment and management under such environmental factors.

Figure 2:
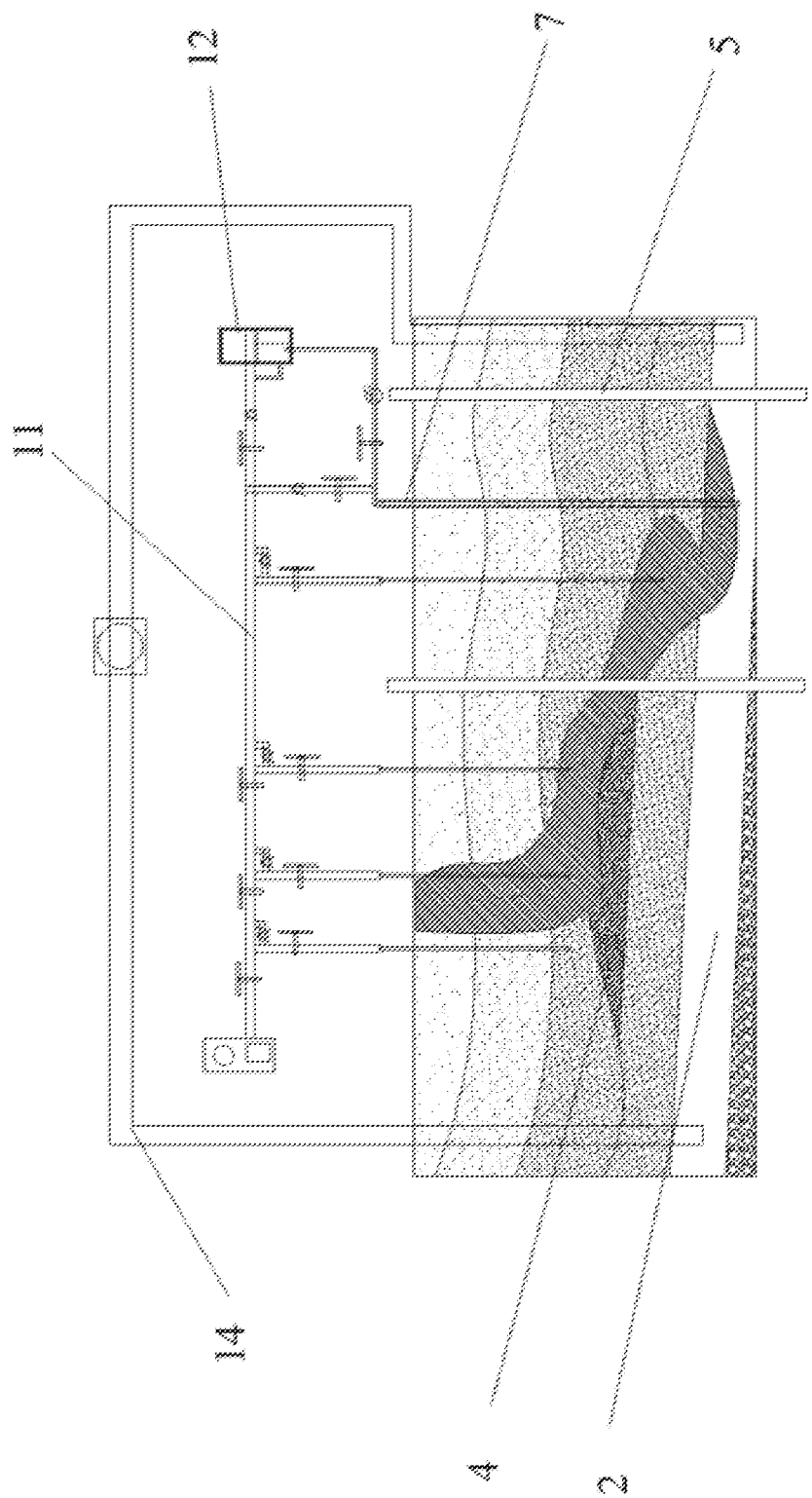
FIG. 2 is a nonhomogeneous soil pollutant multiphase extraction and tail gas purifying device 2.
Figure 3:
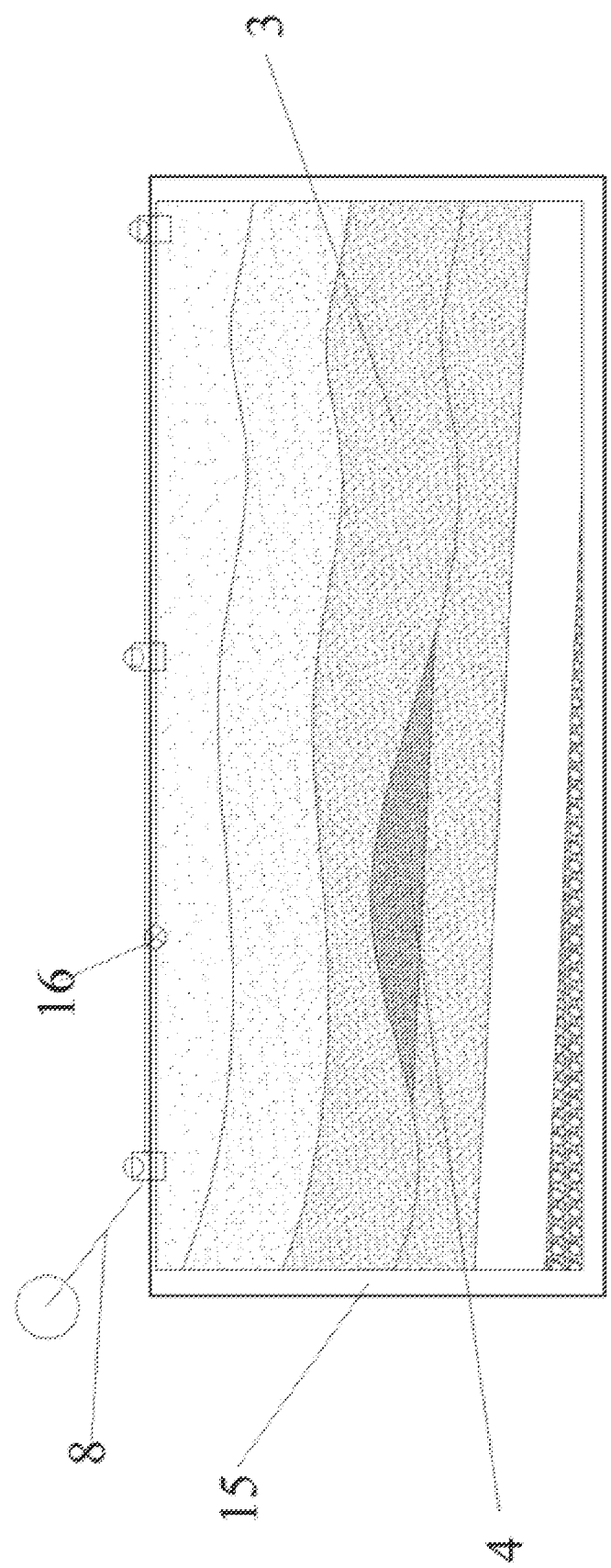
FIG. 3 is a schematic view of the application of a test simulation tank.
Figure 4:
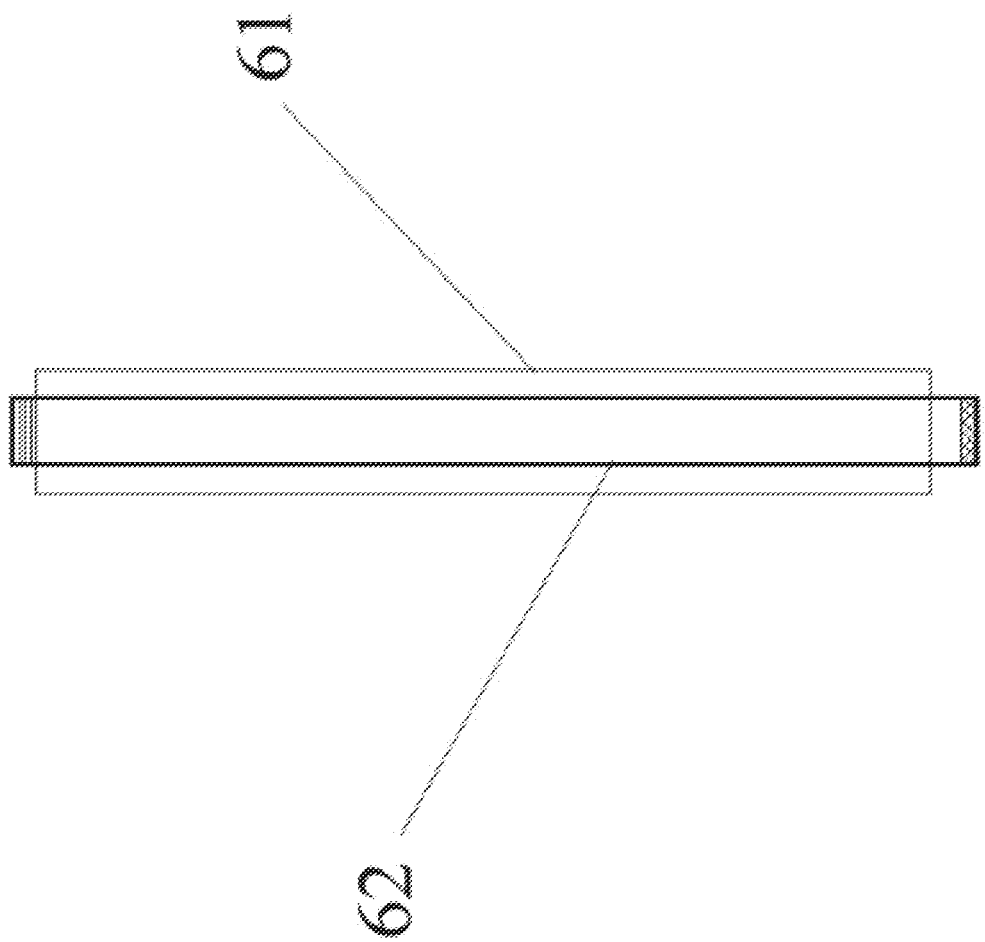
FIG. 4 is a schematic view showing the structures of an extraction outer cylinder and an extraction inner cylinder.
Figure 5:
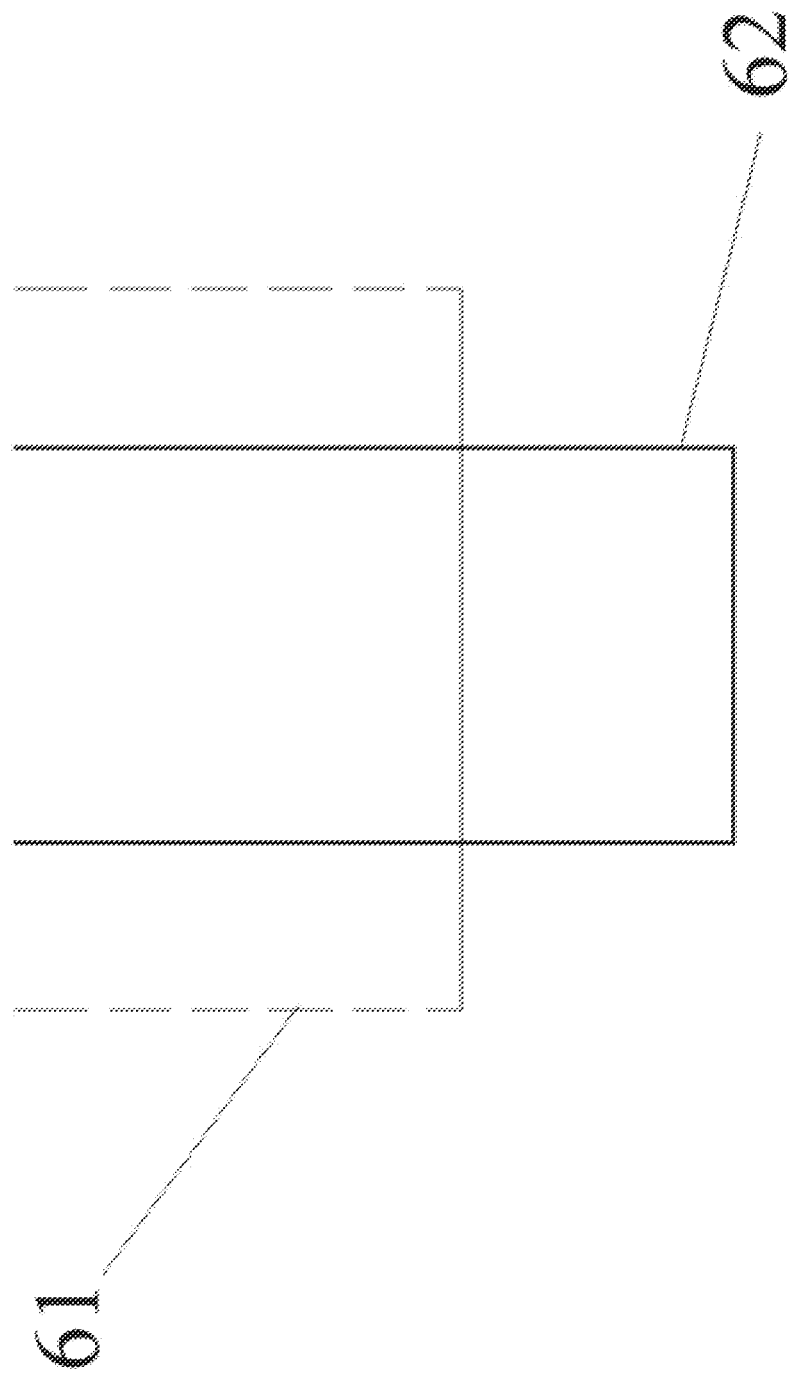
FIG. 5 is a schematic view showing bottom structures of an extraction outer cylinder and an extraction inner cylinder.
Figure 6:
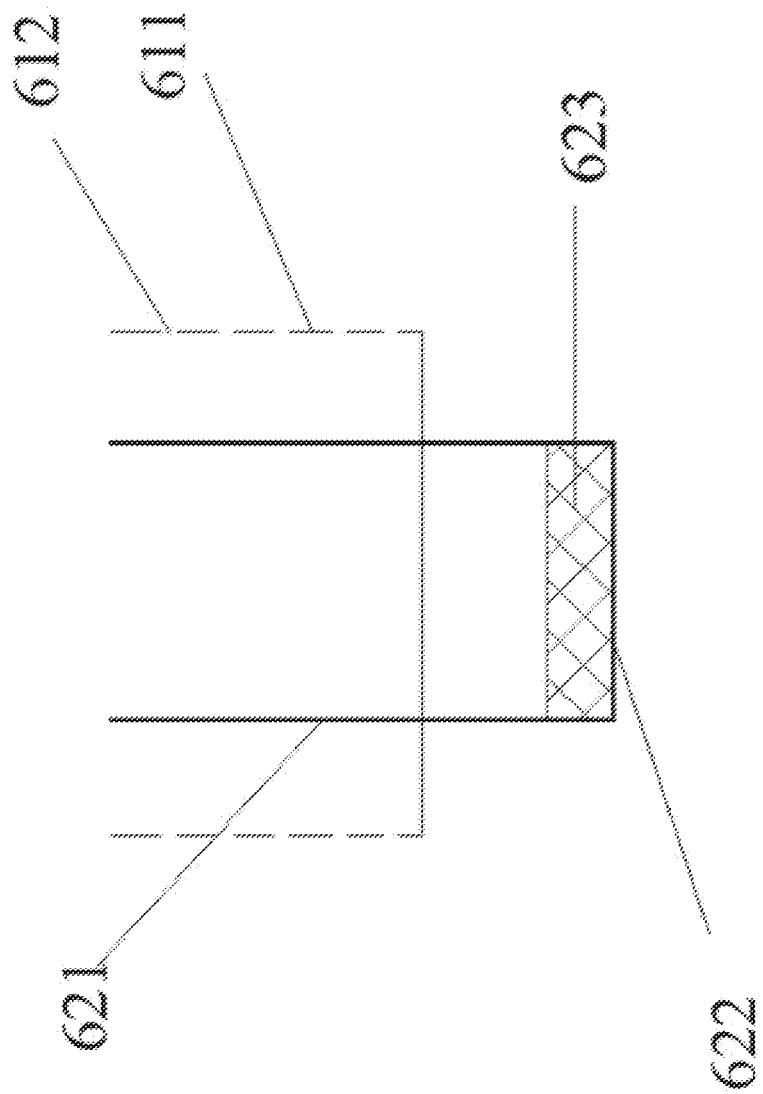
FIG. 6 is a schematic view showing the structure of an extraction inner cylinder containing a filter plate.
Figure 7:
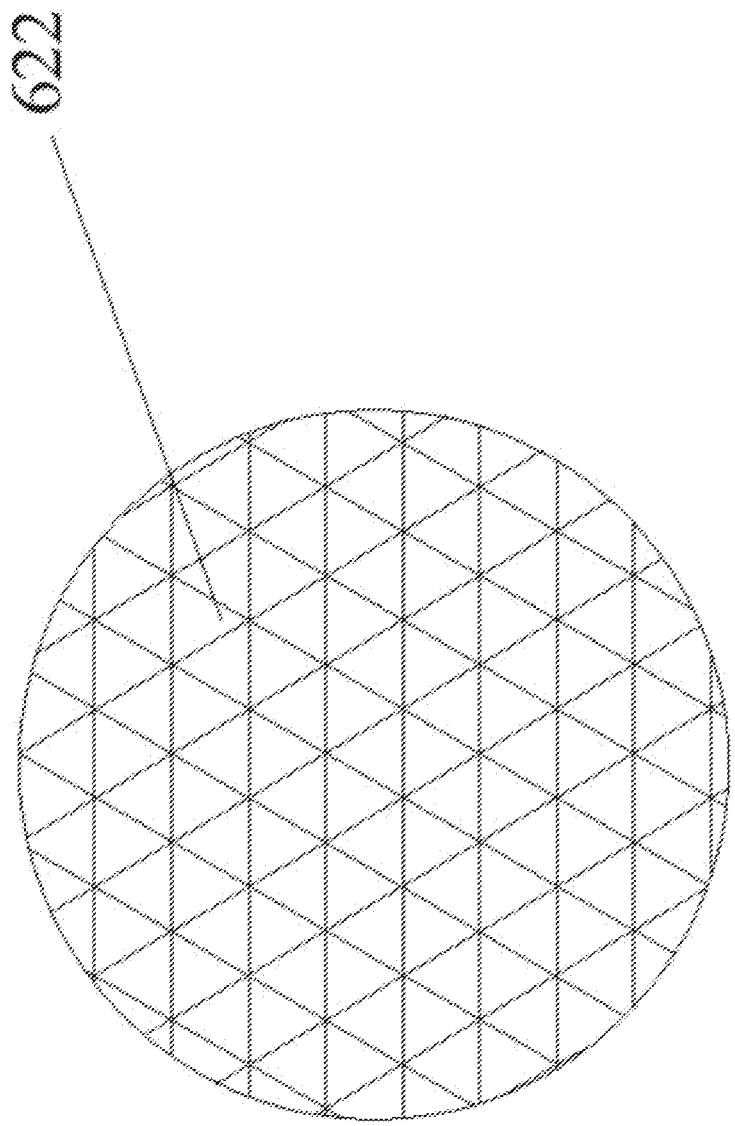
FIG. 7 is a schematic view of the structure of a liquid inner cylinder bottom.
Figure 8:
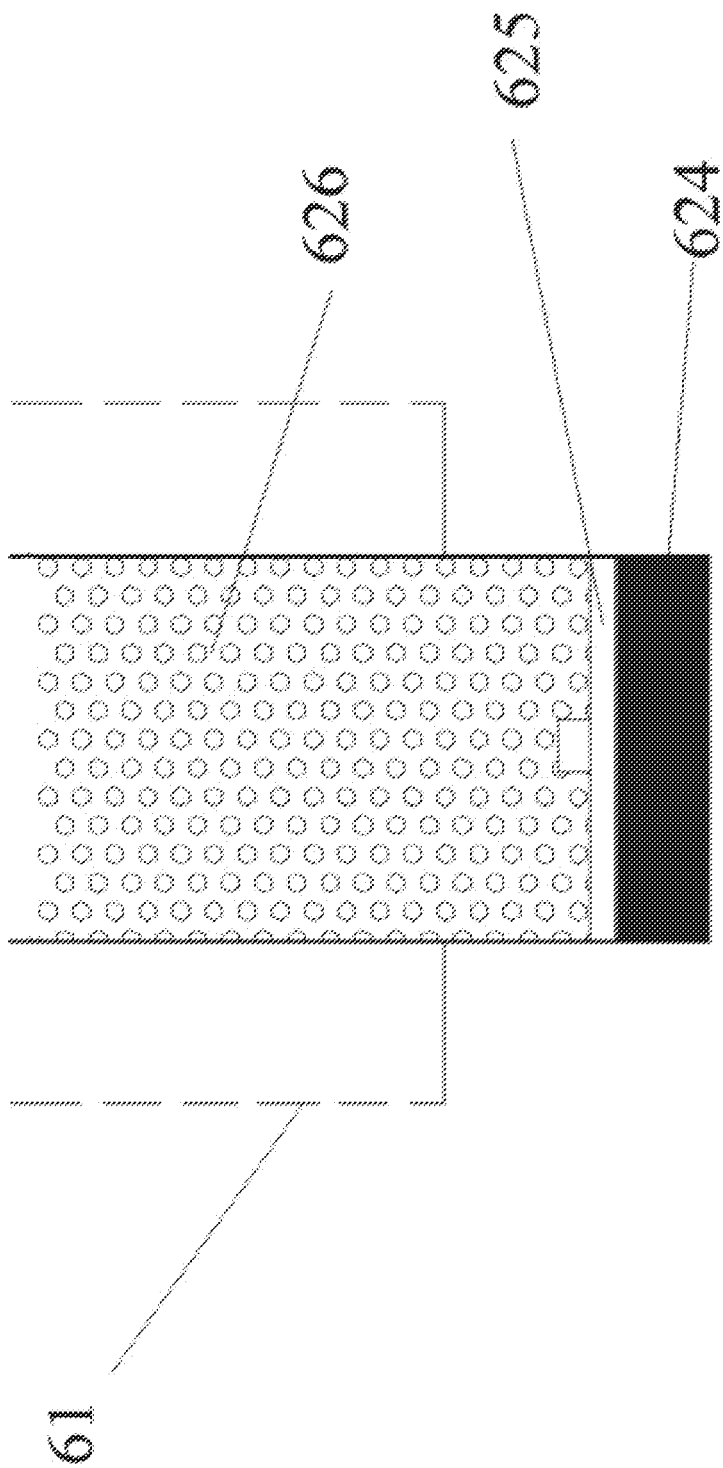
FIG. 8 is a schematic view showing the structure of an extraction inner cylinder containing a plugging plate and an attaching pad.
Figure 9:
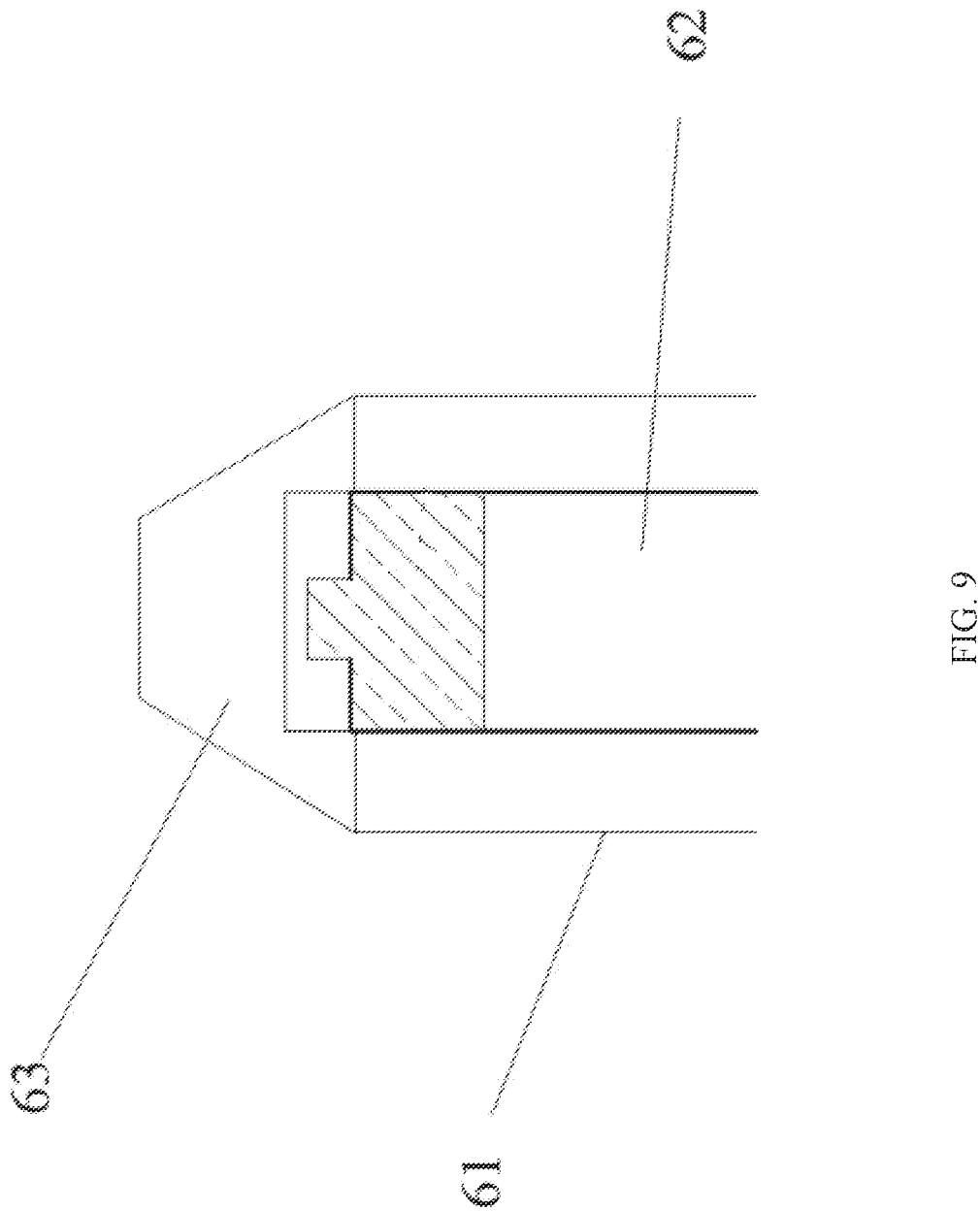
FIG. 9 is a schematic view showing the structure of an extraction outer cylinder containing a horn mouth.
Figure 10:
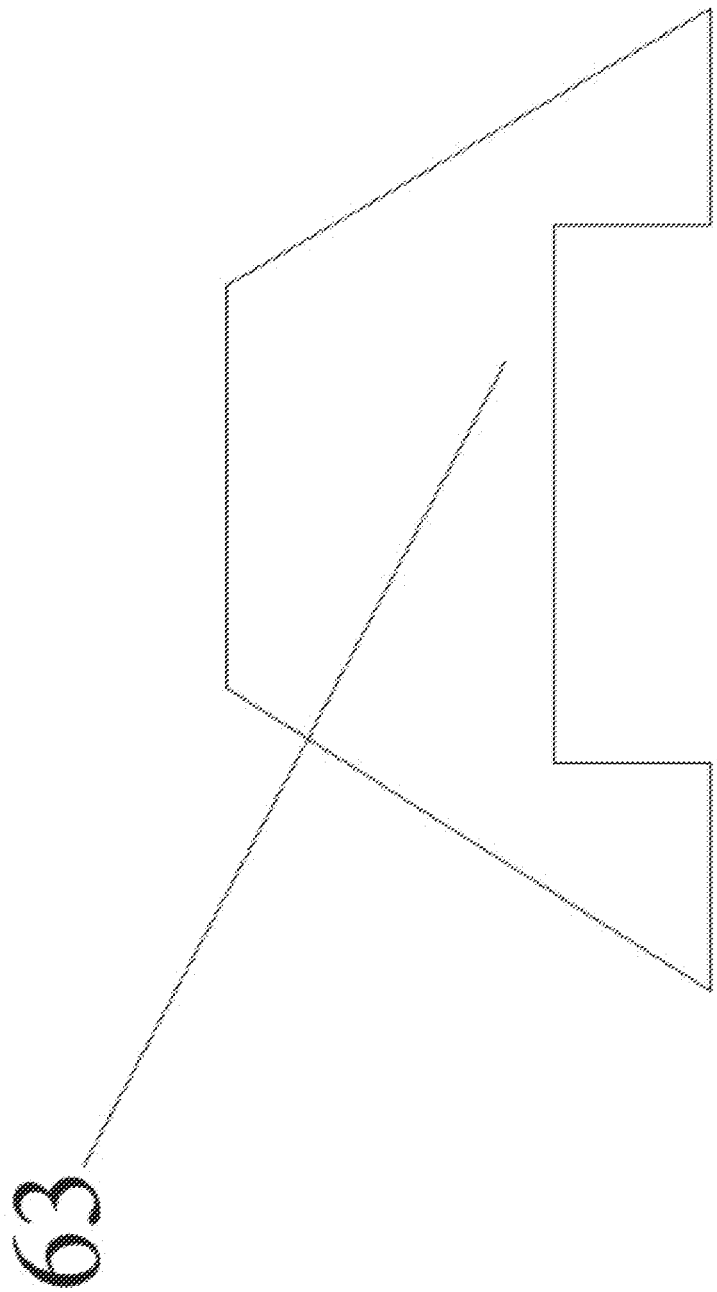
FIG. 10 is a schematic view of the structure of a horn mouth.
Figure 11:
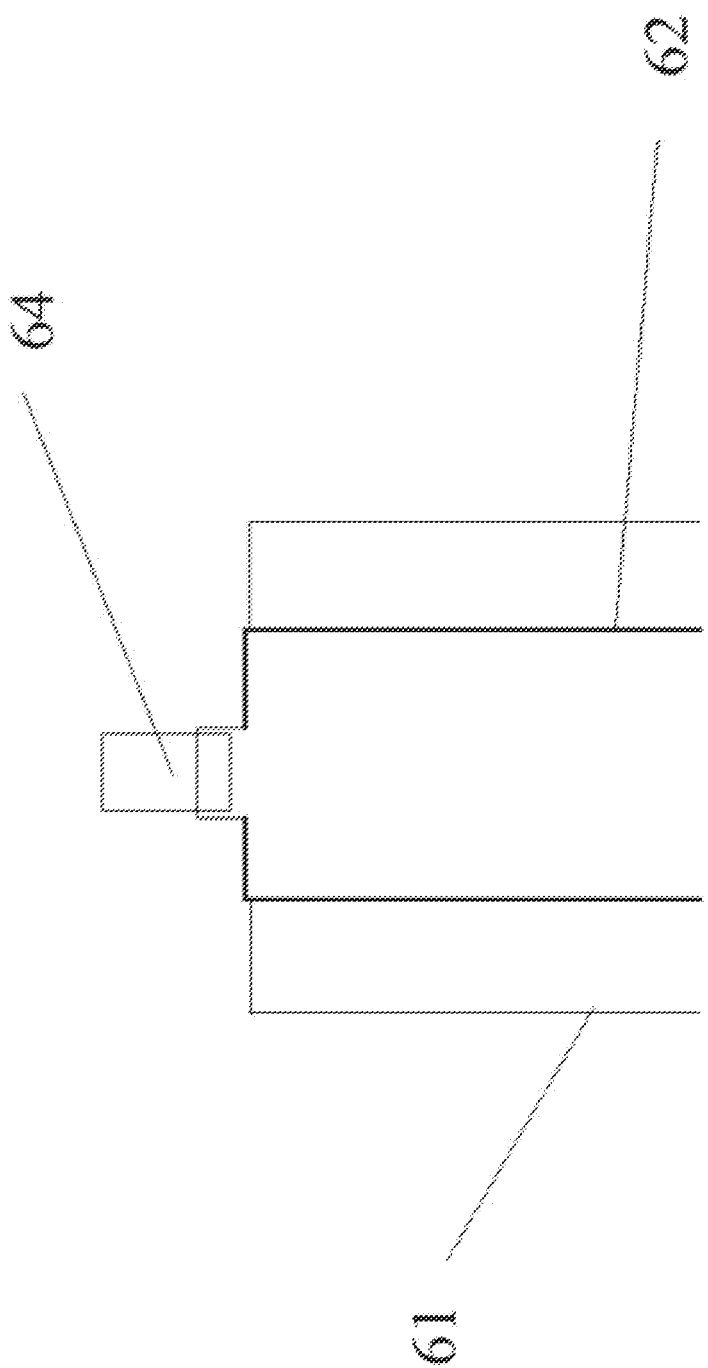
FIG. 11 is a schematic view of a structure containing a straight connector.
Figure 12:
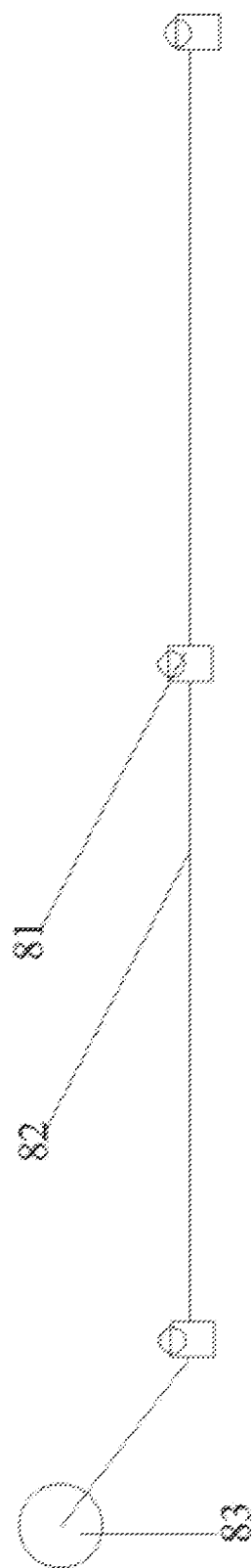
FIG. 12 is a schematic view of the connection of a geophysical prospecting system.
Figure 13:
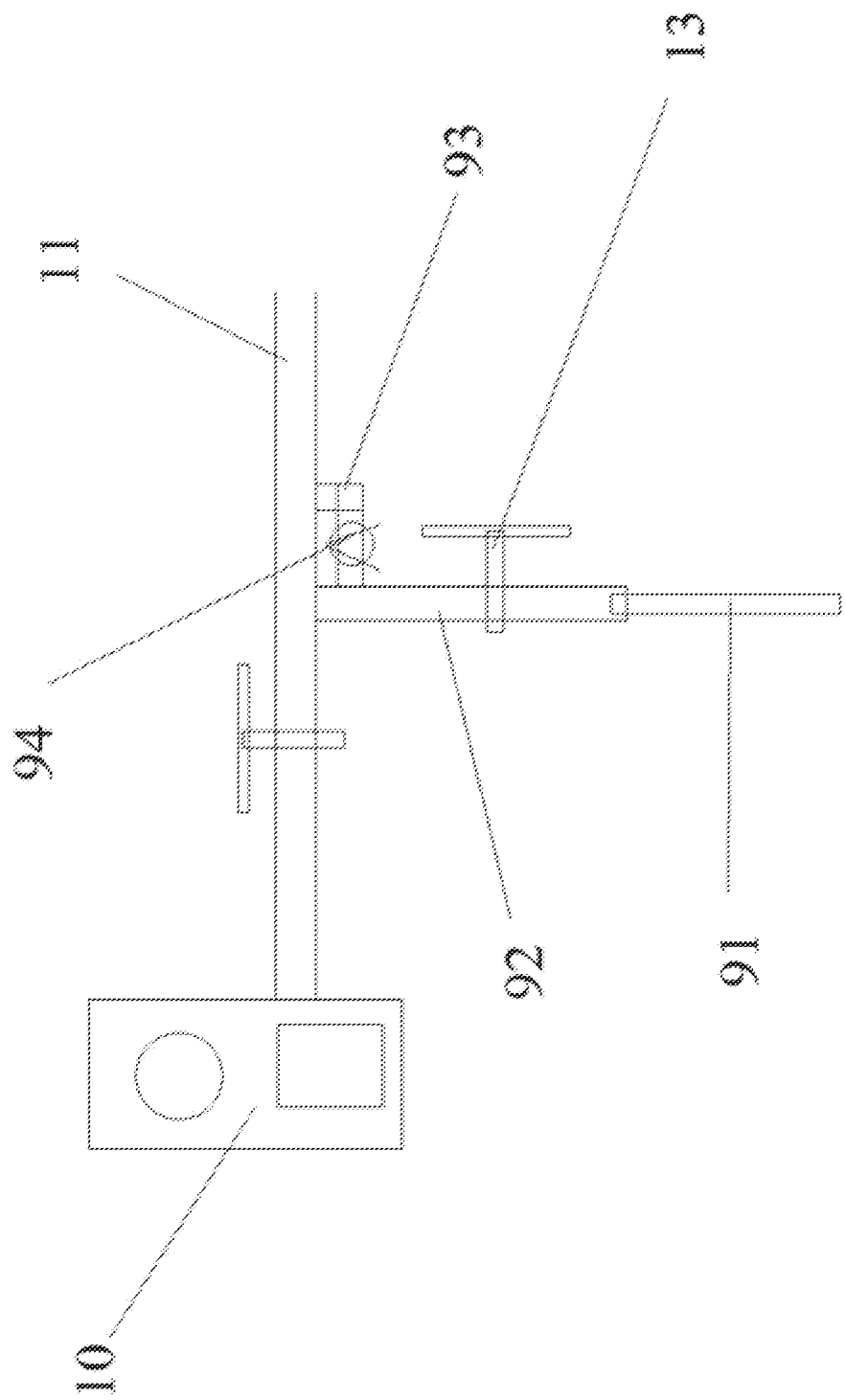
FIG. 13 is a schematic view showing the structure of a dosing and steam integrated device and a main connection pipeline.
Figure 14:
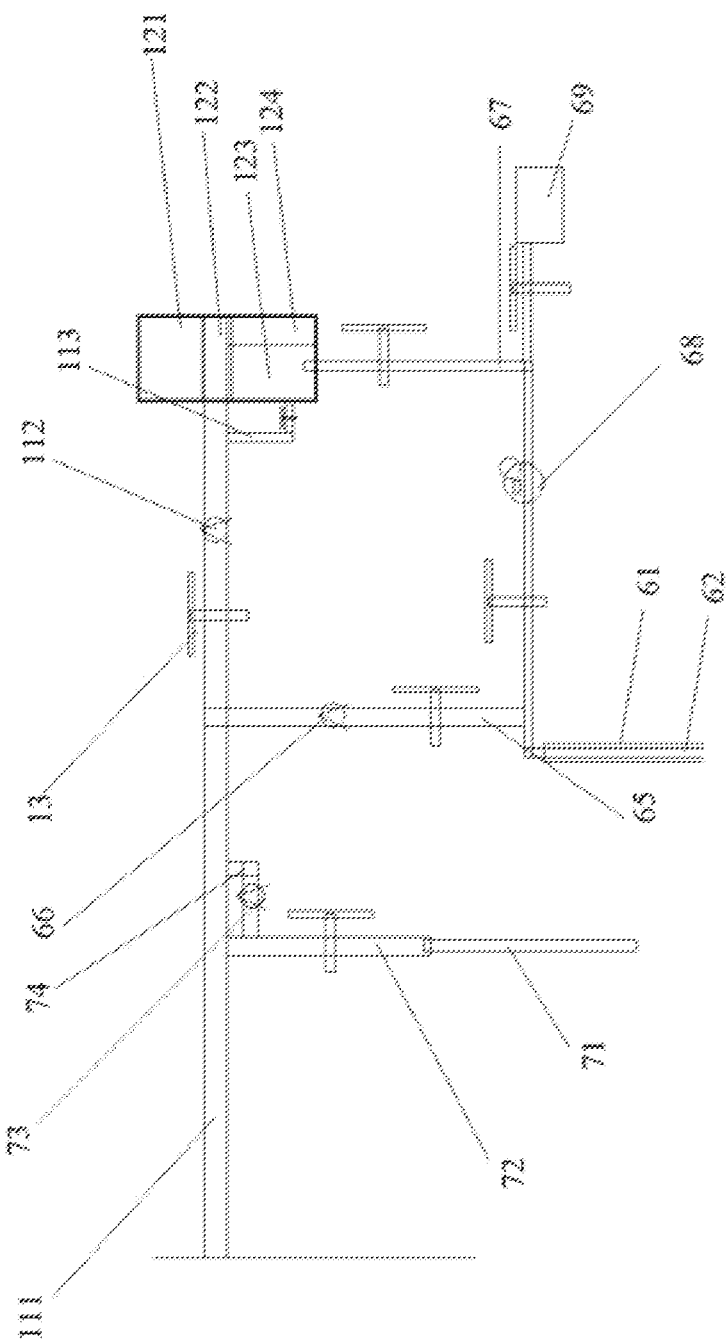
FIG. 14 is a schematic view of a tail gas purifying apparatus and a connecting structure thereof.
Figure 15:
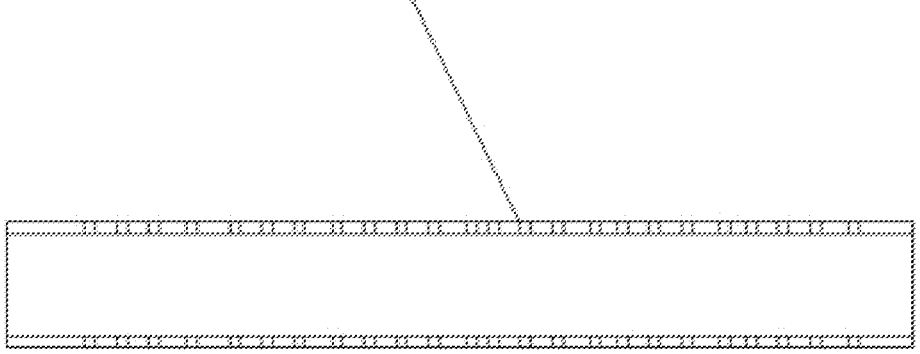
FIG. 15 is a schematic view of the structure of a near-water extraction cylinder or a nonhomogeneous soil layer extraction cylinder.

As shown in FIGS. 1 to 17, a nonhomogeneous soil pollutant multiphase extraction and tail gas purifying device comprises two water retaining walls 5, a water layer extraction system 6 and a near-water soil layer extraction system 7 arranged in a groundwater layer 2 in the two water retaining walls 5, a nonhomogeneous soil layer extraction system 9 arranged at a nonhomogeneous soil layer 4 in a homogeneous soil layer 3, a geophysical prospecting system 8 arranged at the top of the homogeneous soil layer 3, and a main connection pipeline 11 connected in parallel to the water layer extraction system 6, the near-water soil layer extraction system 7, the nonhomogeneous soil layer extraction system 9 and the water layer extraction system 6; a dosing and steam integrated device 10 connected to one end of the main connection pipeline 11, and a tail gas purifying apparatus 12 connected to the other end of the main connection pipeline 11.

In the present embodiment, the groundwater layer 2 is located below the groundwater layer 2, the homogeneous soil layer 3 is located above the groundwater layer 2, the nonhomogeneous soil layer 4 is located inside the homogeneous soil layer 3, and the pollution point 16 is located above the nonhomogeneous soil layer 4; the pollution point 16 is a petroleum leakage point and is located in the homogeneous soil layer 3. The homogeneous soil layer 3 is a sand layer or a layer with a large porosity. The nonhomogeneous soil layer 4 is a soil layer with a small porosity or a smaller porosity than that of the homogeneous soil layer 3, a sticky soil layer or a local rock layer, etc.

In the present embodiment, the water layer extraction system 6 comprises an extraction outer cylinder 61, an extraction inner cylinder 62 clamped and connected to the inside of the extraction outer cylinder 61, a horn connector 63 threaded or sleeved and connected to the top of the extraction outer cylinder 61 or a straight connector 64 connected to the top of the extraction outer cylinder 61, a water layer gas delivery pipeline 65 and a water-layer fluid-conveying pipeline 67 connected to the top of the horn connector 63 or the straight connector 64, a water layer extraction pump 66 connected to the water layer gas delivery pipeline 65, and a water layer circulation pump 68 connected to the water-layer fluid-conveying pipeline 67. The extraction outer cylinder 61 and the extraction inner cylinder are both made of a hard plastic pipe or a stainless steel pipe coated with an anti-corrosion layer; the materials of the corresponding horn connector 63 and the straight connector 64 are the same as that of the extraction outer cylinder 61 and the extraction inner cylinder. When the horn connector 63 is connected to the liquid extraction inner cylinder 62, a wooden plug is also provided, which is a rectangular block and has a protrusion at the top. The top of the wooden plug correspondingly blocks the liquid extraction inner cylinder 62, and a cavity is formed between the wooden plug and the horn connector 63.

In the present embodiment, the gas delivery pipeline and the water-layer fluid-conveying pipeline 67 are both connected to the tail gas purifying apparatus 12 and are correspondingly provided with a valve 13. The water-layer fluid-conveying pipeline 67 is also connected to the water supply tank 69; the liquid extraction inner cylinder bottom 622 bottom extends out of the outer extraction cylinder 61, and the liquid extraction inner cylinder 62 extends into the water body; the valve 13 is an automatic valve 13, and the valves 13 on each pipeline are connected to a control terminal via a wire so as to automatically control the opening and closing of the valve 13 and control the flow rate of each pipeline flux. In addition, the water supply tank 69 is a temperature-adjustable water supply, and the temperature of the water in the tank is set according to the ambient temperature at which the petroleum pollutants are volatilized.

In the present embodiment, the dosing and steam integrated device 10 comprises separate dosing chamber and pressurized hot steam chamber, both of which are respectively threaded or hoop-connected to the main connection pipeline 11. The main connection pipeline 11 is correspondingly provided with a valve 13 corresponding to the water layer extraction system 6, the near-water soil layer extraction system 7, the nonhomogeneous soil layer extraction system 9, and the water layer extraction system 6; the valve 13 is an automatic valve 13, and the valves 13 on each pipeline are connected to a control terminal via a wire so as to automatically control the opening and closing of the valve 13 and control the flow rate of each pipeline flux. The main connection pipeline 11 includes a main connection pipe body 111 connected to the tail gas purifying apparatus 12, a main connection pump 112 connected to the main connection pipe body 111, and a main connection liquid pipe 113 connected between the main connection pipe body 111 and the tail gas purifying apparatus 12. The main connection pipeline 11 is a hard plastic pipe or a steel pipe, and the inner wall of the main connection pipeline 11 is coated with an anti-corrosion layer and can be lengthened by assembling and connecting. The main connection pipeline 11 is further provided with a one-way valve 13 at one side of the dosing and steam integrated device 10, and only single delivery of dosing and hot steam can be performed from the dosing and steam integrated device 10 to the main connection pipeline 11, and the extracted gas cannot flow back to the dosing and steam integrated device 10 either.

In the present embodiment, one water retaining wall 5 is located at one side of the nonhomogeneous soil body adjacent to the downstream of the groundwater body, and the other water retaining wall 5 is located at the downstream side of the groundwater body pollution halo; a water pumping and supplementing self-circulation system 14 is further provided on the outer side of the water retaining wall 5. Earth retaining wall or a concrete wall or a steel plate wall, wherein the bottom of the earth retaining wall extends out of the groundwater layer 2 and extends into the lower underwater soil layer 1.

In the present embodiment, the water pumping and supplementing self-circulation system 14 comprises a water pumping pipe 141, a water supplementing pipe 143, and a pumping and supplementing self-circulation pump 142 connected between the water pumping pipe 141 and the water supplementing pipe 143. The water pumping pipe 141 is located at the water body reaching the standard upstream of the groundwater layer 2, and the water supplementing pipe 143 is located outside the water retaining wall 5 of the groundwater body on the downstream side of the pollution halo; the flow velocity of the water body in the pumping self-circulation pump 142 is adapted to the natural flow velocity of the groundwater layer 2.

In the present embodiment, the extraction outer cylinder 61 comprises an extraction outer cylinder wall 611 and extraction outer cylinder holes 612 arranged at intervals on the extraction outer cylinder wall 611; the extraction outer cylindrical hole 612 is provided according to the height of the soil body position by adapting to pollutants at the near-water layer. The liquid extraction inner cylinder 62 comprises a liquid extraction inner cylinder wall 621 and a liquid extraction inner cylinder bottom 622 detachably connected to the bottom of the liquid extraction inner cylinder wall 621. The liquid extraction inner cylinder bottom 622 is a mesh plate body, the liquid extraction inner cylinder bottom 622 is clamped and connected to a filter plate 623 or a plugging plate 624, and the top of the plugging plate 624 is correspondingly connected to an attaching pad 625; the attaching pad 625 is an inverted T-shaped piece, the transverse part of the inverted T-shaped piece is an apical grafting insertion rod corresponding to the vertical part of the sealing pad, and the insertion rod is a rigid feeding rod. During the construction, the attaching pad 625 is virtually connected by a long insertion rod, and is fed into the liquid extraction inner cylinder bottom 622 together with the plugging plate 624 for sealing.

In the present embodiment, the near-water soil layer extraction system 7 comprises a near-water extraction drum 71, a near-water composite pipeline 72 connected between the near-water extraction drum 71 and the main connection pipeline 11, a near-water gas delivery pipeline 74 connected between the near-water extraction drum 71 and the main connection pipeline 11, and a near-water extraction pump 73 connected to the near-water gas delivery pipeline 74.

In the present embodiment, the nonhomogeneous soil layer extraction system 9 comprises a nonhomogeneous soil layer extraction cylinder 91, a nonhomogeneous soil layer composite pipeline 92 connected between the nonhomogeneous soil layer extraction cylinder 91 and the main connection pipeline 11, a nonhomogeneous soil layer gas delivery pipeline 94 connected between the nonhomogeneous soil layer extraction cylinder 91 and the main connection pipeline 11, and a nonhomogeneous soil layer extraction pump 93 connected to the nonhomogeneous soil layer gas delivery pipeline 94; the water composite pipeline, the near-water gas delivery pipeline 74, the nonhomogeneous composite pipeline 92, and the nonhomogeneous gas delivery pipeline 94 are respectively provided with a valve 13. The valve 13 is an automatic valve 13, and the valves 13 on each pipeline are connected to a control terminal via a wire so as to automatically control the opening and closing of the valve 13 and control the flow rate of each pipeline flux.

In the present embodiment, an inner blocking cylinder 17 is also detachably connected in the near-water extraction cylinder 71 and the nonhomogeneous soil layer extraction cylinder 91, a cross bar member 18 is detachably connected at the top of the inner blocking cylinder 17, the inner blocking cylinder 17 comprises an upper non-porous plate and a lower porous plate, and the lower porous plate is arranged corresponding to the hole walls of the extraction cylinders in the near-water extraction cylinder 71 and the nonhomogeneous soil layer extraction cylinder 91, and its height is arranged corresponding to the dosing height. In specific applications, according to the dosing height or the hot steam laying area from top to bottom, the targeted arrangement of the cross bar member 18 and the inner blocking cylinder 17 is performed so that the dosing or the hot steam output is performed correspondingly on the hole walls of the extraction cylinders in the near-water extraction cylinder 71 and the nonhomogeneous soil layer extraction cylinder 91.

In the present embodiment, the geophysical prospecting system 8 comprises a geophysical prospecting point 81, a geophysical prospecting connecting line 82 connected in series thereon, and a geophysical prospecting integrated data processor 83 provided on one side; the geophysical prospecting point 81 is correspondingly provided with a geophysical prospecting instrument, and the geophysical prospecting point 81 is provided at least at the pollution point 16 and upstream and downstream of the soil body pollution plume. The geophysical prospecting instrument detects the formation by means of acoustic waves, electromagnetic waves, or ground-penetrating radar, etc.

In the present embodiment, the tail gas purifying apparatus 12 is provided on site, and the tail gas purifying apparatus 12 comprises a spraying layer 121 at the top, an adsorption layer 122 below the spraying layer 121, and a liquid-collecting stuffing chamber 123 and a filtering chamber 124 below the adsorption layer 122, the adsorption layer 122 being correspondingly connected to the main connection pipe body 111, and the liquid-collecting stuffing chamber 123 being correspondingly connected to the main connection liquid pipe 113 and the water layer infusion pipe 67. An exit is provided at the bottom of the filter chamber 124 in the tail gas purifying apparatus 12, and the exit is correspondingly connected to a waste material recovery vehicle and a carrier vehicle, so as to facilitate later transportation, recycling and reusing, or advanced re-treatment.

With reference to FIGS. 1-17, the construction method for a nonhomogeneous soil pollutant multiphase extraction and tail gas purifying device is further described, and the specific steps are as follows.

Step 1, based on the position of the pollution point 16, performing the layout of the geophysical prospecting point 81; then connecting the geophysical prospecting point 81 to be finally connected to the geophysical prospecting integrated data processor 83; combining the geophysical prospecting data and the borehole exploration data, determining the soil layer distribution, groundwater distribution, flow direction and flow velocity of the polluted land parcel, and defining the position and range of the nonhomogeneous soil layer 4.

Step 2, based on the geophysical prospecting data and geological survey data at the position containing the pollutants, performing a simulation in a laboratory by means of the test simulation tank 15, and laying off the geophysical prospecting data and saving the same before setting the pollution point 16 in the test simulation tank 15, and then setting the pollution point 16 correspondingly for the test simulation tank 15 and collecting the geophysical prospecting data and pollutant data at each stage of pollutant migration, and fitting the pollutant migration law according to the geophysical prospecting data at each stage to obtain the change response law of the geophysical prospecting data.

Step 3, fitting the test result with a three-dimensional software to simulate solute migration, obtaining an accurate three-dimensional model after the fitting meets the standard, then determining the range of the pollution plume, and calibrating the site actual control range through the three-dimensional model; at this time, collecting site geophysical prospecting data at regular intervals, and performing comparative analysis on the same with the geophysical prospecting data obtained from the test so as to correct the model in time.

The test simulation tank 15 is a cuboid sand box, wherein the cuboid sand box is provided in a rectangular-ambulatory-plane, the corresponding soil layer and groundwater layer 2 are provided in an inner rectangle shape, and a circulating water body is provided between the outer rectangle shape and the inner rectangle shape, the water body between the inner rectangle shape and outer rectangle shape being in communication with the simulated groundwater layer 2.

Step 4, then performing site drilling and sampling to further refine and measure the range of the pollution plume, and performing encrypted laying-off on the nonhomogeneous soil layer 4; then dividing the pollution site into two areas; one being the pollution area of the nonhomogeneous soil layer 4 and the other being the pollution area of the groundwater layer 2.

Step 5, providing one water retaining wall 5 between the pollution area of the homogeneous soil layer 3 and the pollution area of the groundwater layer 2 and providing another water retaining wall 5 downstream the groundwater, and at the same time, providing a water pumping and supplementing self-circulation system 14 on one side of the water retaining wall 5 upstream and downstream of the groundwater meeting the standard, so that the water bodies on both sides of the water retaining wall 5 maintain a natural flow velocity.

Step 6, installing a water layer extraction system 6 at a position where pollutants are enriched in the groundwater in the two water retaining walls 5, and installing a near-water soil layer extraction system 7 at the water retaining wall 5 adjacent to the upstream; installing a nonhomogeneous soil layer extraction system 9 around the nonhomogeneous soil layer 4; then connecting the main connection pipeline 11 correspondingly to the top of the water layer extraction system 6, the near-water soil layer extraction system 7, the nonhomogeneous soil layer extraction system 9, and the water layer extraction system 6; then, connecting the two ends of the main connection pipeline 11 correspondingly to the dosing and steam integrated device 10 and the tail gas purifying apparatus 12.

Step 7, when the pollutants are treated, in the water layer extraction system 6 at the groundwater layer 2, firstly connecting the straight connector 64 to start the liquid extraction inner cylinder 62, and after a filter plate 623 is installed, performing the extraction of the pollutants flowing in a dissolved state and a free state so that they enter the tail gas purifying apparatus 12 through the water-layer fluid-conveying pipeline 67; after the extracted liquid to be tested contains pollutants less than the extraction standard, sealing the liquid extraction inner cylinder 62 by inserting and installing a plugging plate 624 and an attaching pad 625, and then filling hot water through water supply tank 69, wherein the temperature of hot water is adapted to the volatilization temperature of the pollutants.

Step 8, during the extraction construction in the near-water soil layer extraction system 7 and nonhomogeneous soil layer extraction system 9, firstly injecting the hot steam and a medicament via the dosing and steam integrated device 10 and the main connection pipeline 11, and when injecting, gradually and appropriately adding medicament and hot steam in layers and heights via the inner blocking cylinder 17 and the cross bar member 18; then, after sufficient reaction, performing volatile gas phase extraction of pollutants through the near-water extraction cylinder 71 and the nonhomogeneous soil layer extraction cylinder 91.

Step 9, correspondingly, when gas is extracted from inside the near-water soil layer extraction system 7, replacing the straight connector 64 of the water layer extraction system 6 with a horn connector 63 and injecting hot water 626 into the extraction inner cylinder, wherein the temperature of the hot water 626 is adapted to the pollutant volatilization temperature; then starting the extraction outer cylinder 61 to perform the extraction of the pollutant gas phase, and making it enter the tail gas purifying apparatus 12 through the water layer gas delivery pipeline 65 so that the multiphase extraction, and tail gas and tail liquid treatment of organic volatilizable pollutants are thereby achieved.

Wherein, in the tail gas purifying apparatus 12, the spraying layer 121 at the top and the adsorption layer 122 below are arranged in an inverted triangular shape, the spraying layer 121 is not arranged right above the adsorption layer 122, the spraying layers 121 at the two sides are low-pressure air-entraining, and the sprayed liquid is collected into the liquid-collecting stuffing chamber 123 below; the filler in the liquid-collecting stuffing chamber 123 is an iron-manganese oxide composite carbon-based functional material, and a permeable membrane is provided in the filter chamber 124.

The above descriptions are only preferred embodiments of the present invention, and the scope of the present invention is not limited thereto. Any changes or substitutions conceived by those skilled in the art within the technical scope disclosed by the present invention shall be included within the scope of the present invention.

What is claimed is:

1. A nonhomogeneous soil pollutant multiphase extraction and tail gas purifying device, comprising two water retaining walls (5), a water layer extraction system (6) and a near-water soil layer extraction system (7) arranged in a groundwater layer (2) between the two water retaining walls (5), a nonhomogeneous soil layer extraction system (9) arranged at a nonhomogeneous soil layer (4) in a homogeneous soil layer (3), a geophysical prospecting system (8) arranged at a top of the homogeneous soil layer (3), and a main connection pipeline (11) connected in parallel to the water layer extraction system (6), the near-water soil layer extraction system (7), the nonhomogeneous soil layer extraction system (9) and the water layer extraction system (6); a dosing and steam integrated device (10) connected to one end of the main connection pipeline (11), and a tail gas purifying apparatus (12) connected to the other end of the main connection pipeline (11);

wherein the groundwater layer (2) is located below the nonhomogeneous soil layer (4), the homogeneous soil layer (3) is located above the groundwater layer (2), the nonhomogeneous soil layer (4) is located inside the homogeneous soil layer (3), and a pollution point (16) is located above the nonhomogeneous soil layer (4); pollutants of the pollution point (16) are organic matter volatile pollutants;

the water layer extraction system (6) comprises an extraction outer cylinder (61), a extraction inner cylinder (62) detachably connected to the inside of the extraction outer cylinder (61), a horn connector (63) connected to the top of the extraction outer cylinder (61) or a straight connector (64) connected to the top of the extraction outer cylinder (61), a water layer gas delivery pipeline (65) and a water-layer fluid-conveying pipeline (67) connected to the top of the horn connector (63) or the straight connector (64), a water layer extraction pump (66) connected to the water layer gas delivery pipeline (65), and a water layer circulation pump (68) connected to the water-layer fluid-conveying pipeline (67); a gas delivery pipeline and the water-layer fluid-conveying pipeline (67) are both connected to the tail gas purifying apparatus (12) and are correspondingly provided with a valve (13); the water-layer fluid-conveying pipeline (67) is also connected to the water supply tank (69); the liquid extraction inner cylinder bottom (622) part extends out of the outer extraction cylinder (61), and the liquid extraction inner cylinder (62) extends into a water body; the dosing and steam integrated device (10) comprises separate dosing chamber and pressurized hot steam chamber, and both the dosing chamber and the pressurized hot steam chamber are respectively detachably connected to the main connection pipeline (11); the main connection pipeline (11) is provided with a valve (13) corresponding to the water layer extraction system (6), the near-water soil layer extraction system (7), the nonhomogeneous soil layer extraction system (9), and the water layer extraction system (6); the main connection pipeline (11) comprises a main connection pipe body (111) connected to the tail gas purifying apparatus (12), a main connection pump (112) connected to the main connection pipe body (111), and a main connection liquid pipe (113) connected between the main connection pipe body (111) and the tail gas purifying apparatus (12).

2. The nonhomogeneous soil pollutant multiphase extraction and tail gas purifying device according to claim 1, wherein one water retaining wall (5) is located at one side of a nonhomogeneous soil body adjacent to a downstream of a groundwater body, and the other water retaining wall (5) is located at a downstream side of groundwater body pollution halo; a water pumping and supplementing self-circulation system (14) is further provided on an outer side of the water retaining wall (5);

the water pumping and supplementing self-circulation system (14) comprises a water pumping pipe (141), a water supplementing pipe (143), and a pumping and supplementing self-circulation pump (142) connected between the water pumping pipe (141) and the water supplementing pipe (143); the water pumping pipe (141) is located at the water body reaching a standard upstream of the groundwater layer (2), and the water supplementing pipe (143) is located outside the water retaining wall (5) of the groundwater body on the downstream side of pollution halo; a flow velocity of a water body in the pumping self-circulation pump (142) is adapted to a natural flow velocity of the groundwater layer (2).

3. The nonhomogeneous soil pollutant multiphase extraction and tail gas purifying device according to claim 1, wherein the extraction outer cylinder (61) comprises an extraction outer cylinder wall (611) and extraction outer cylinder holes (612) arranged at intervals on the extraction outer cylinder wall (611); the extraction outer cylindrical hole (612) is provided according to a height of a soil body position by adapting to pollutants at a near-water layer;

the liquid extraction inner cylinder (62) comprises a liquid extraction inner cylinder wall (621) and a liquid extraction inner cylinder bottom (622) detachably connected to a bottom of the liquid extraction inner cylinder wall (621);

the liquid extraction inner cylinder bottom (622) is a mesh plate body, the liquid extraction inner cylinder bottom (622) is detachably connected to a filter plate (623) or a plugging plate (624), and the top of the plugging plate (624) is correspondingly connected to an attaching pad (625); the attaching pad (625) is an inverted T-shaped piece, a transverse part of the inverted T-shaped piece is an apical grafting insertion rod corresponding to a vertical part of a sealing pad, and an insertion rod is a rigid feeding rod.

4. The nonhomogeneous soil pollutant multiphase extraction and tail gas purifying device according to claim 1, wherein the near-water soil layer extraction system (7) comprises a near-water extraction cylinder (71), a near-water composite pipeline (72) connected between the near-water extraction cylinder (71) and the main connection pipeline (11), a near-water gas delivery pipe (74) connected between the near-water extraction cylinder (71) and the main connection pipeline (11), and a near-water extraction pump (73) connected to the near-water gas delivery pipe (74);

the nonhomogeneous soil layer extraction system (9) comprises a nonhomogeneous soil layer extraction cylinder (91), a nonhomogeneous soil layer composite pipeline (92) connected between the nonhomogeneous soil layer extraction cylinder (91) and the main connection pipeline (11), a nonhomogeneous soil layer gas delivery pipeline (94) connected between the nonhomogeneous soil layer extraction cylinder (91) and the main connection pipeline (11), and a nonhomogeneous soil layer extraction pump (93) connected to the nonhomogeneous soil layer gas delivery pipeline (94);

the water composite pipeline, the near-water gas delivery pipeline (74), the nonhomogeneous soil layer composite pipeline (92), and the nonhomogeneous soil layer gas delivery pipe (94) are all correspondingly provided with a valve (13).

5. The nonhomogeneous soil pollutant multiphase extraction and tail gas purifying device according to claim 4, wherein an inner blocking cylinder (17) is also detachably connected in the near-water extraction cylinder (71) and the nonhomogeneous soil layer extraction cylinder (91), a cross bar member (18) is detachably connected at the top of the inner blocking cylinder (17), the inner blocking cylinder (17) comprises an upper non-porous plate and a lower porous plate, and the lower porous plate is arranged corresponding to hole walls of extraction cylinders in the near-water extraction cylinder (71) and the nonhomogeneous soil layer extraction cylinder (91), and its height is arranged corresponding to a dosing height.

6. The nonhomogeneous soil pollutant multiphase extraction and tail gas purifying device according to claim 1, wherein the geophysical prospecting system (8) comprises a geophysical prospecting point (81), a geophysical prospecting connecting line (82) connected in series thereon, and a geophysical prospecting integrated data processor (83) provided on one side; the geophysical prospecting point (81) is correspondingly provided with a geophysical prospecting instrument, and the geophysical prospecting point (81) is provided at least at the pollution point (16) and upstream and downstream of soil body pollution plume.

7. The nonhomogeneous soil pollutant multiphase extraction and tail gas purifying device according to claim 1, wherein the tail gas purifying apparatus (12) comprises a spraying layer (121) at the top, an adsorption layer (122) below the spraying layer (121), a liquid-collecting stuffing chamber (123) and a filter chamber (124) below the adsorption layer (122), wherein the adsorption layer (122) is correspondingly connected to the main connection pipe body (111), and the liquid-collecting stuffing chamber (123) is correspondingly connected to the main connection liquid pipe (113) and the water-layer fluid-conveying pipeline (67).

8. A construction method for the nonhomogeneous soil pollutant multiphase extraction and tail gas purifying device according to any one of claims 1 to 7, wherein specific steps are below:

step 1, based on the position of the pollution point (16), performing a layout of the geophysical prospecting point (81); then connecting the geophysical prospecting point (81) to be finally connected to a geophysical prospecting integrated data processor (83); combining geophysical prospecting data and borehole exploration data, determining soil layer distribution, groundwater distribution, flow direction, and flow velocity of a polluted land parcel, and defining the position and a range of the nonhomogeneous soil layer (4);

step 2, based on the geophysical prospecting data and geological survey data at the position containing the pollutants, performing a simulation in a laboratory by means of a test simulation tank (15), and laying off the geophysical prospecting data and saving the same before setting the pollution point (16) in the test simulation tank (15), and then setting the pollution point (16) correspondingly for the test simulation tank (15) and collecting the geophysical prospecting data and pollutant data at each stage of pollutant migration, and fitting a pollutant migration law according to the geophysical prospecting data at each stage to obtain a change response law of the geophysical prospecting data;

step 3, fitting a test result with a three-dimensional software to simulate solute migration, obtaining an accurate three-dimensional model after the fitting meets the standard, then determining the range of pollution plume, and calibrating a site actual control range through a three-dimensional model; at this time, collecting site geophysical prospecting data at regular intervals, and performing comparative analysis on the same with the geophysical prospecting data obtained from the test so as to correct the model in time;

step (4), then performing site drilling and sampling to further refine and measure the range of the pollution plume, and performing encrypted laying-off on the nonhomogeneous soil layer (4); then dividing a pollution site into two areas; one being a pollution area of the nonhomogeneous soil layer (4) and the other being the pollution area of the groundwater layer (2);

step 5, providing one water retaining wall (5) between the pollution area of the homogeneous soil layer (3) and the pollution area of the groundwater layer (2) and providing another water retaining wall (5) downstream the groundwater, and at the same time, providing a water pumping and supplementing self-circulation system (14) on one side of the water retaining wall (5) upstream and downstream of the groundwater meeting the standard so that the water bodies on both sides of the water retaining wall (5) maintain a natural flow velocity;

step 6, installing the water layer extraction system (6) at a position where pollutants are enriched in the groundwater in the two water retaining walls (5), and installing the near-water soil layer extraction system (7) at the water retaining wall (5) adjacent to the upstream; installing the nonhomogeneous soil layer extraction system (9) around the nonhomogeneous soil layer (4); then connecting the main connection pipeline (11) correspondingly to the top of the water layer extraction system (6), the near-water soil layer extraction system (7), the nonhomogeneous soil layer extraction system (9), and the water layer extraction system (6); then, connecting two ends of the main connection pipeline (11) correspondingly to the dosing and steam integrated device (10) and the tail gas purifying apparatus (12);

step 7, when the pollutants are treated, in the water layer extraction system (6) at the groundwater layer (2), firstly connecting the straight connector (64) to start the liquid extraction inner cylinder (62), and after a filter plate (623) is installed, performing extraction of the pollutants flowing in a dissolved state and a free state so that they enter the tail gas purifying apparatus (12) through the water-layer fluid-conveying pipeline (67); after extracted liquid to be tested contains pollutants less than an extraction standard, sealing the liquid extraction inner cylinder (62) by inserting and installing a plugging plate (624) and an attaching pad (625), and then filling hot water through the water supply tank (69), wherein a temperature of hot water is adapted to a volatilization temperature of the pollutants;

step 8, during extraction construction in the near-water soil layer extraction system (7) and nonhomogeneous soil layer extraction system (9), firstly injecting hot steam and a medicament via the dosing and steam integrated device (10) and the main connection pipeline (11), and when injecting, gradually and appropriately adding medicament and hot steam in layers and heights via an inner blocking cylinder (17) and a cross bar member (18); then, after sufficient reaction, performing volatile gas phase extraction of pollutants through the near-water extraction cylinder (71) and the nonhomogeneous soil layer extraction cylinder (91);

and step 9, correspondingly, when gas is extracted from inside the near-water soil layer extraction system (7), replacing the straight connector (64) of the water layer extraction system (6) with the horn connector (63) and injecting hot water (626) into the extraction inner cylinder, wherein the temperature of the hot water (626) is adapted to the pollutant volatilization temperature; then starting the extraction outer cylinder (61) to perform the extraction of pollutant gas phase, and making it enter the tail gas purifying apparatus (12) through the water layer gas delivery pipeline (65) so that multiphase extraction, and tail gas and tail liquid treatment of organic volatilizable pollutants are thereby achieved.

9. The construction method for a nonhomogeneous soil pollutant multiphase extraction and tail gas purifying device according to claim 8, wherein the test simulation tank (15) is a cuboid sand box, wherein the cuboid sand box is provided in a rectangular-ambulatory-plane, corresponding soil layer and groundwater layer (2) are provided in an inner rectangle shape, and a circulating water body is provided between an outer rectangle shape and the inner rectangle shape, the water body between the inner rectangle shape and outer rectangle shape being in communication with a simulated groundwater layer (2).

10. The construction method for a nonhomogeneous soil pollutant multiphase extraction and tail gas purifying device according to claim 8, wherein in the tail gas purifying apparatus (12), a spraying layer (121) at the top and an adsorption layer (122) below are arranged in an inverted triangular shape, the spraying layer (121) is not arranged right above the adsorption layer (122), the spraying layers (121) at two sides are low-pressure air-entraining, and sprayed liquid is collected into a liquid-collecting stuffing chamber (123) below;

fillers in the liquid-collecting stuffing chamber (123) are iron-manganese oxide composite carbon-based functional materials, and a permeable membrane is provided in a filter chamber (124).

\* \* \* \* \*